(12) United States Patent
Sengupta et al.

(10) Patent No.: US 6,288,674 B1
(45) Date of Patent: Sep. 11, 2001

(54) WIRELESS COMMUNICATION SYSTEM UTILIZING DOPPLER DIVERSITY

(75) Inventors: Chaitali Sengupta, Dallas; Carl Panasik, Garland, both of TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/510,086

(22) Filed: Feb. 22, 2000

Related U.S. Application Data

(60) Provisional application No. 60/172,895, filed on Dec. 21, 1999.

(51) Int. Cl.[7] ............................................. G01S 3/52
(52) U.S. Cl. ................ 342/418; 342/357.05; 342/357.06
(58) Field of Search ................... 342/357.01, 357.06, 342/357.05, 402, 418, 357.1, 367; 701/213

(56) References Cited

U.S. PATENT DOCUMENTS

| | | | | |
|---|---|---|---|---|
| 4,754,283 | * | 6/1988 | Fowler | 342/461 |
| 5,920,284 | * | 7/1999 | Victor | 342/357.01 |
| 6,017,959 | * | 8/2000 | Levanon | 342/357 |

* cited by examiner

*Primary Examiner*—Dao Phan
(74) *Attorney, Agent, or Firm*—Pedro P. Hernandez; W. James Brady, III; Frederick J. Telecky, Jr.

(57) ABSTRACT

In one aspect, the present invention discloses a communication device (see, for example, FIG. 5), such as a mobile unit (e.g., a cellular telephone handset) or a stationary unit (e.g., a cellular telephone base station). The communication device utilizes global positioning system (GPS) information 560 within a Doppler profile generator 540. For example, in a mobile unit, the GPS information would typically be generated at the device. A receiver 520 is coupled to the Doppler profile generator 550. The receiver 520 utilizes Doppler profile information in translating a received wireless signal into user information.

25 Claims, 4 Drawing Sheets

WIRELESS COMMUNICATION SYSTEM UTILIZING DOPPLER DIVERSITY

This application claims priority under 35 USC §119 (e)(1) of Provisional Application No. 60/172,895, filed Dec. 21, 1999.

FIELD OF THE INVENTION

The present invention relates to communication systems in general and more particularly to a wireless communication system utilizing Doppler diversity.

BACKGROUND OF THE INVENTION

Cellular telephones are commonplace in today's society. As a result, there is a desire to be able to accommodate more users at higher data rates in a given geographic area. Wireless communications are also being implemented for services besides voice. For example, wireless communications are now being planned and implemented to allow access to the Internet and other networks from mobile devices.

As the uses for wireless communications continue to expand, the reliability of the communication must be continually improved. One problem that greatly degrades the performance of mobile communications systems is multipath fading. This phenomenon is caused by the reflection of the signal from multiple scatterers. Moreover, this environment is constantly changing due to the motion of mobile receivers and transmitters.

One technique that has been used in practice to combat fading is diversity. Diversity implies the exploitation of multiple copies of the transmitted signal at the receiver. Common examples of diversity includes, time diversity, frequency (Doppler), and spatial diversity. The mobile wireless channel provides inherent diversity in the form of multiple paths (time diversity) which is exploited in current cellular systems through the use of rake receivers.

In current systems, rake receivers exploit multipath diversity by combining the various multipath components. The use of rake receivers, however, assumes that the channel characteristics vary slowly over time and is suitable for slow-fading situations. As a result, the performance degrades in the presence of Doppler induced by rapid channel variations due to fast relative motion between the transmitter and the receiver.

Recently a new technique to exploit rapid channel variations to improve performance through joint multipath-Doppler diversity processing has been proposed, in the research community, for CDMA systems. This technique facilitates maximal exploitation of channel diversity in slow as well as fast fading scenarios, thus combating fading in both situations.

SUMMARY OF THE INVENTION

In one aspect, the present invention utilizes the fact that future cellular handsets sold in the United States will incorporate GPS receivers in order to accommodate a government mandated requirement to support emergency notification services (e.g., E911) in mobile environments. This GPS unit can be utilized to determine the current vector of motion of a mobile terminal, which will also be communicated to the base station. The GPS information can be used to estimate the Doppler profile of the wireless channel between the mobile and the base station.

The current vector of motion (the relative velocity of the mobile with respect to the base station) translates into knowledge of the Doppler spread which in turn translates to the number of Doppler components that can be exploited at the receiver. The combined knowledge of Doppler and multipath profiles of the channel can be used to apply diversity exploiting schemes such as the rake, but in a two-dimensional time-frequency framework. In the preferred embodiment, the Doppler as well as multipath components are combined using maximal ratio combining to enhance the performance of the system.

As an example, a method of communicating between a mobile communication unit and a second communication unit (either stationary or mobile) would include determining the location and velocity of the mobile unit at a particular time. This information is preferably determined using global positioning system (GPS) information. A velocity vector of the mobile communication unit relative to the stationary communication unit can be calculated from GPS information. From this velocity vector, a Doppler profile can be calculated. The system could then use the Doppler profile in communicating between the mobile communication unit and the stationary communication unit.

The present invention can be used with either a mobile unit or a stationary unit. The communication unit of this aspect of the invention utilizes global positioning system (GPS) information within a Doppler profile generator. For example, in a mobile unit, the GPS information would typically be generated at the device. A receiver, e.g., a rake receiver, is coupled to the Doppler profile generator. The receiver utilizes Doppler profile information in translating a received wireless signal into user information.

The present invention provides a number of benefits relative to the prior art. In some aspects, these benefits are in terms of improved performance of the cellular system in a fast-fading scenario, which is a scenario where the conventional rake receiver suffers drastically. Exploiting Doppler diversity to improve performance will be possible in any situation where the effective processing time (typically, the symbol period) is long enough compared to the rate of variation of the channel. In addition, the underlying channel representation for joint multipath-Doppler processing facilitates more accurate modeling of the signal structure of the desired as well as the interfering users, which will lead to improved interference suppression.

BRIEF DESCRIPTION OF THE DRAWINGS

The above features of the present invention will be more clearly understood from consideration of the following descriptions in connection with accompanying drawings in which.

DETAILED DESCRIPTION

The making and use of the presently preferred embodiments are discussed below in detail. However, it should be appreciated that the present invention provides many applicable inventive concepts that can be embodied in a wide variety of specific contexts. The specific embodiments discussed are merely illustrative of specific ways to make and use the invention, and do not limit the scope of the invention.

The present invention relates to communications systems. In one aspect, the invention attempts to mitigate the effects of Doppler frequency shifting between the transmitter and receiver in a wireless communication system.

Figure 1:
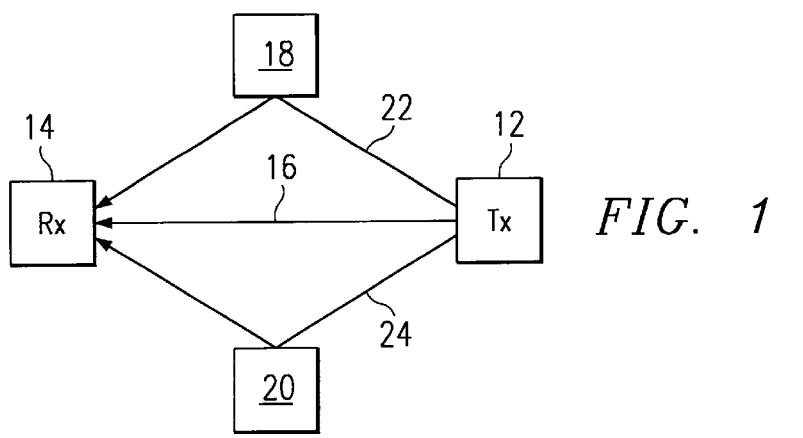
FIG. 1 is a simplified diagram of a wireless communication system.

FIG. 1 illustrates a simplified view of a wireless communications system 10. In this figure, a transmitting unit 12 transmits a message to a receiving unit 14. The transmitting unit 12 may comprise either a mobile communication unit (e.g., a handset) or a stationary communication unit (e.g., a base station). Likewise, the receiving unit 14 would typically comprise a stationary communication unit when the transmitter 12 is a mobile communication unit and would comprise a mobile communication unit when the transmitter 12 is a stationary communication unit. Of course, in a cellular telephone application as an example, the handset and base station both serve as transmitter 12 and receiver 14.

It is also noted that the present invention would be applicable in the situation where both the transmitter 12 and receiver 14 are mobile units. For example, communications may occur directly between two handsets. While not realizing all of the advantages, the invention would also apply when both the transmitter 12 and receiver 14 are stationary units.

FIG. 1 illustrates three communications paths between transmitter 12 and receiver 14. First communication path 16 signifies a direct path between the two units. In an ideal world without any reflectors, this direct path would be the only path. In the real world, however, obstacles such as buildings, trees and others will cause reflections of the transmitted signal. It is noted that the range of the angle of arrival of the various paths is finite.

Two such obstacles 18 and 20 are shown in FIG. 1. These obstacles 18 and 20 will cause the transmitted signal to take additional paths 22 and 24, respectively. Since the length of each of the paths 16, 22 and 24 are all different, multiple copies of the originally transmitted signal will arrive at the receiver 14, each copy slightly varying in delay from the others. In addition, each path is distinct in the time domain when the signal bandwidth exceeds the coherence bandwidth of the wireless channel.

The different signals received at the receiver 14 will each have different delays and different attenuations. As a result, the combination of these signals will cause either constructive or destructive interference. This interference will lead to fades and/or reinforcement of the received signal. This phenomenon is referred to as multipath fading.

Another problem arises when the transmitter 12 and receiver 14 are moving relative to one another. This situation can occur, for example, when a subscriber uses her cell phone in a moving car. In this case, due to the Doppler effect, the velocity, including speed and direction, of the car will affect the frequency of the signal that is received at the receiver 14.

Figure 2:
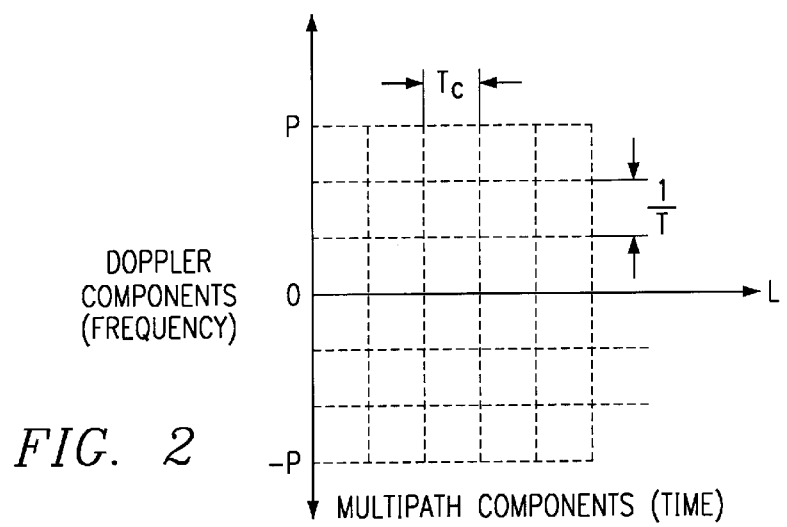
FIG. 2 is a multipath-Doppler representation of a wireless communication channel.
Figure 3:
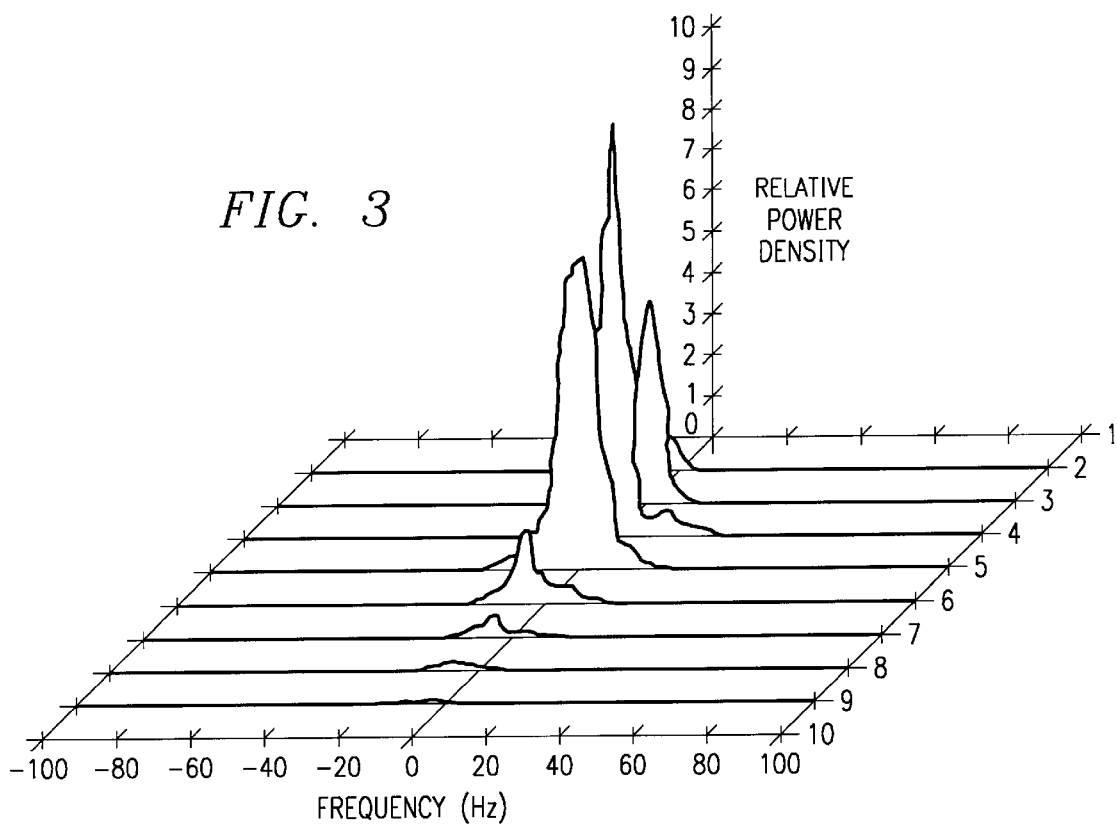
FIG. 3 shows the measured time-frequency channel profile of an actual wireless channel.

FIG. 2 shows one possible representation of the multipath-Doppler components of the channel in the time-frequency plane for a CDMA (code division multiple access) system. FIG. 3, which was taken from J. G. Proakis, *Digital Communications*, McGraw-Hill, Inc. Boston, Mass., 1995, $3^{rd}$ edition, page 767, shows the measured time-frequency channel profile of an actual wireless channel.

Analogous to the rake receiver, the objective is to identify independent Doppler-shifted components, out of the continuum available, to create Doppler diversity. The number of multipath components, (L+1), is dictated by the multipath spread, $(T_m)$, of the channel and the number of Doppler components, (2P+1), is defined by the Doppler spread, $(B_d)$. The following equations will help explain the details of the channel model.

For asynchronous BPSK (binary phase shift key) signals, the received signal r(t) is given by $$r(t) = \sum_{k=1}^{K} x_k(t - \tau_k) + n(t) \quad (1)$$

where K is the number of users, $x_k(t)$ is the received signal of the $k^{th}$ user with delay $\tau_k$, and n(t) is additive white Gaussian noise. In terms of the channel representations, the signal of the $k^{th}$ user can be expressed as $$x_k(t) = \frac{T_c}{T} \sum_i b_k(i) \sum_{l=0}^{L_k} \sum_{p=-P_k}^{P_k} H_k^{p,l}(i) u_k^{p,l}(t - iT) \quad (2)$$

where $b_k(i)$ denotes the $i^{th}$ bit, $H_k^{p,l}$ is the time-frequency spreading function of the channel corresponding to the $i^{th}$ bit as seen by the $k^{th}$ user, and $u_k^{p,l}$ are the time frequency shifted copies of the transmitted signal. Also T is the symbol period and $T_c$ is the chip period. In FIG. 2, $H_k^{p,l}$ are the weights at each grid point in the time-frequency plane.

In order to best exploit the inherent diversity, as explained in A. M. Sayeed and B. Aazhang, "Exploiting Doppler Diversity in Mobile Wireless Communications," Conference on Informations Sciences and Systems, Baltimore, March 1997, provided by the wireless channel, CDMA receivers should preferably implement joint multipath-Doppler processing. The Doppler as well as multipath components can be combined using maximal ratio combining to enhance the performance of the system.

In one aspect, the present invention provides a practical implementation of such a system. In this system, identification of each multipath-Doppler component at the channel estimation stage is provided. In current CDMA systems, only the multipath components are identified, and the number of such components vary according to the environment. The present invention, on the other hand, provides a technique to identify the Doppler components. First the frequency spread P will be identified and that will define the points on the frequency axis which need to be scanned for the corresponding value of H.

In the preferred embodiment, the present invention utilizes a GPS (global positioning system) receiver to help determine the Doppler components. Cellular handsets sold in the United States will incorporate GPS receivers in order to accommodate a U.S. government mandated requirement (October 2001) to support E911 in mobile environments and to provide the basis for a large variety of location-based services. This mandatory inclusion of the GPS can also be exploited in other ways to enhance the performance of the entire cellular network.

Exploitation of Doppler diversity can be a powerful tool for combating fast fading which will be faced by future generation cellular systems, as the supported vehicular speeds increase. The current radial velocity (the relative velocity between the transmitter and the receiver projected along a line between the two), which will be known at the receiver due to the handset GPS, can be used to estimate the Doppler profile of the wireless channel between the transmitter and the receiver. The current radial velocity translates into knowledge of the Doppler spread $B_d$ which in turn directly gives the value of P. See T. S. Rappaport, *Wireless Communications—Principles and Practice,* Prentice Hall, Inc., Upper Saddle River, N.J., 1996., p. 165, incorporated herein by reference. The velocity information gives the Doppler spread using a very well known relationship that $B_d = v/\lambda$, where $\lambda$ is the wavelength.

Once the time-frequency grid points (in FIG. 2) have been identified, the multipath-Doppler channel profile can be estimated using existing channel estimation techniques. One such channel estimation technique is the sliding window correlation in which a signal is located in time and frequency with the help of transmission of a known sequence. The combined knowledge of Doppler and multipath profiles of the channel will be used to apply diversity exploiting schemes such as the rake, but in a two-dimensional time-frequency framework. The Doppler as well as multipath components can be combined using maximal ratio combining to enhance the performance of the system.

Figure 8:
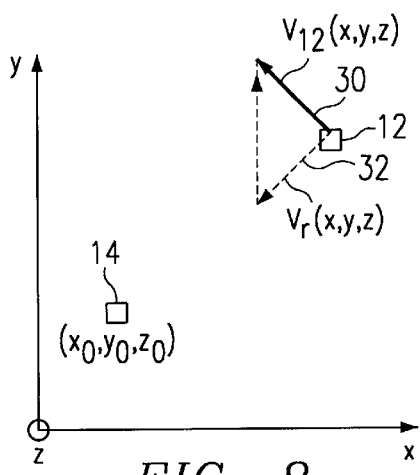
FIG. 8 illustrates the computation of radial velocity for one embodiment of the present invention.

FIG. 8 can be used to describe an exemplary method of how Doppler diversity can be used. In FIG. 8, two communication units 12 and 14 are shown in three-dimensional spacial relationship. For simplicity in the figure, it is assumed that $z_0$ is equal to $z_1$ although it should be understood that this is not a requirement (e.g., if the mobile unit 12 is within an elevator). Here it is assumed that receiver 14 is stationary (e.g., a base station) and transmitter 12 is mobile (e.g., a handset). The same principles would apply if the receiver 14 was mobile and the transmitter 12 was stationary.

To calculate the Doppler profile in the preferred embodiment, one calculates the velocity along a vector between the two units. First, the location of the two units should be determined. Since receiver 14 is stationary its location will be known. The location of transmitter 12 can be determined using GPS information. Second, the relative velocities of the two units should also be determined. This can be accomplished by determining a velocity vector 30 of the mobile unit 12. This vector is three-dimensional, having components in the x, y and z directions (e.g., latitude, longitude and elevation directions).

Third from the location and velocity information of the two units 12 and 14, a radial velocity 32 projected along a vector between the mobile communication unit 12 and the stationary communication unit 14 can be determined. This radial velocity 32 will also be three-dimensional. The radial velocity 32 can be used to calculate Doppler profile as discussed herein.

Figure 10:
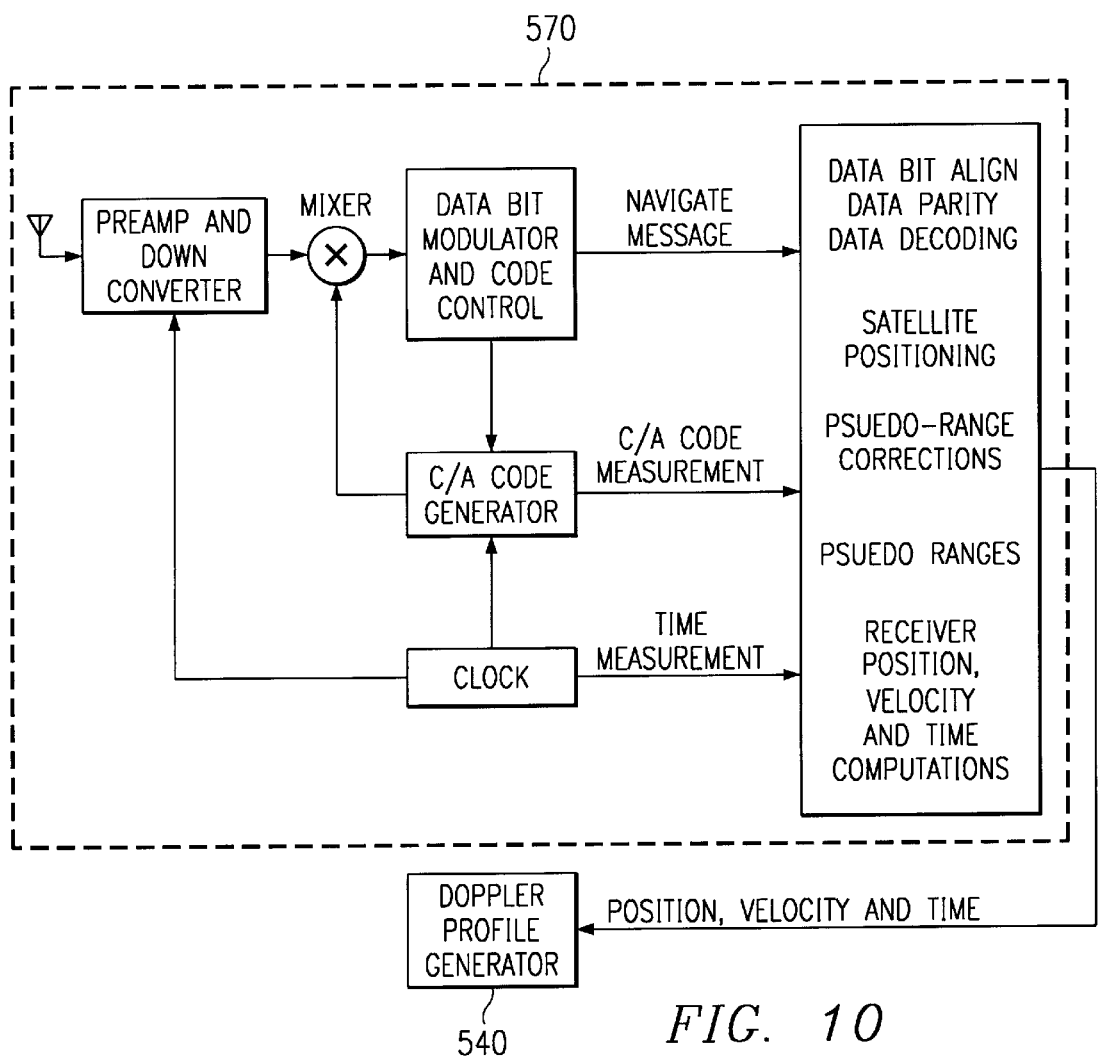
FIG. 10 shows a block diagram of a GPS unit and a Doppler profile generator.

In the preferred embodiment, the location and velocity information are provided by a GPS unit (see e.g., FIG. 10). In an alternate embodiment, the GPS unit might provide only location information. The velocity vector can be determined by determining the location of the mobile communications unit at a first time and again at a second time. Based on the two locations and the time difference, the velocity of the mobile communications unit relative to the stationary communication unit can be calculated.

Figure 9:
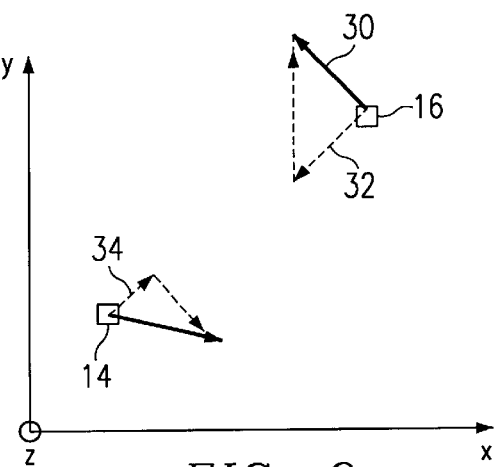
FIG. 9 illustrates the computation of radial velocity for a second embodiment of the present invention.

In the example of FIG. 8, it was assumed that unit 12 was mobile and unit 14 stationary. FIG. 9 illustrates an example where both units are mobile. In this case, a velocity vector 32 is calculated for unit 12 and a second velocity vector 34 is calculated for unit 14. These velocities 32 and 34 can then be subtracted to get a relative velocity which is then projected along the line between the two units to get the radial velocity vector.

The present invention, in many of its aspects, provides advantages over current commercial systems. For example, rake receivers in current systems assume slow-fading and process the received signal only along the time-axis in FIG. 2. The rake receivers only exploit the large bandwidth of CDMA systems but not the large time-bandwidth product of such a system. As a result, performance of rake receivers suffers considerably in the presence of fast-fading induced by fast relative motion between the mobile and the base station. On the other hand, future generation cellular systems will want to support higher and higher mobile speeds.

The benefits provided by aspects of the invention are primarily in terms of improved performance of the cellular system in a fast-fading scenario. Knowledge of the vector of motion of a mobile through GPS will allow identification of Doppler components in the channel. The Doppler components can be combined at the receiver to combat fast fading, which is a scenario where the conventional rake receiver suffers drastically. Exploiting Doppler diversity to improve performance will be possible in any situation where the effective processing time (typically, the symbol period) is long enough compared to the rate of variation of the channel. In addition, the underlying channel representation for joint multipath-Doppler processing facilitates more accurate modeling of the signal structure of the desired as well as the interfering users, which will lead to improved interference suppression.

Figure 4:
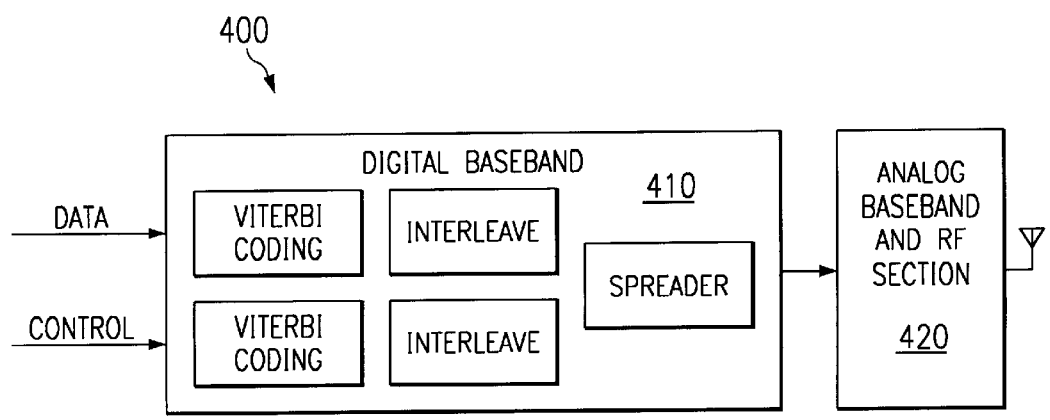
FIG. 4 shows a block diagram of a transmitter of the present invention.
Figure 5:
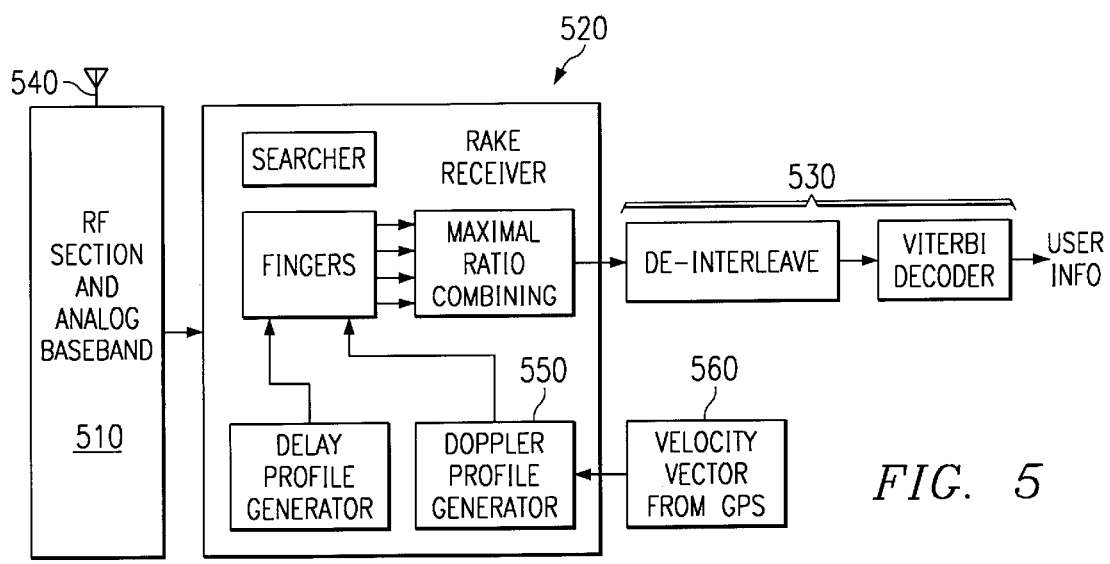
FIG. 5 shows a block diagram of a receiver of the present invention.

Exemplary embodiments of a transmitter and a receiver are shown in FIG. 4 and FIG. 5, respectively. In the preferred embodiment, the transmitter and receiver are both included in a single unit. This unit can be either a handset or a base station. Of course, the handset and base station would include different operating parameters, but these differences are not critical to this aspect of the present invention.

Referring to FIG. 4, a transmitter 400 includes a digital baseband portion 410 and an analog baseband and RF section 420. In the illustrated embodiment, digital baseband portion 410 receives data and control signals from the user or the network. Digital processing (channel encoding) such as Viterbi coding, interleaving and spreading may then be performed. While not shown, the analog portion 420 may include digital-to-analog conversion, frequency conversion and amplification.

Referring to FIG. 5, a receiver 500 includes an RF and analog baseband portion 510, a two-dimensional (i.e., utilizes two types of diversity, for example, multipath and Doppler) rake receiver 520 and a channel decoder 530. The elements are used to take the signal received at antenna 540 and generate data (e.g., user information).

As illustrated in FIG. 5, the receiver also includes a Doppler profile generator 550. The Doppler profile generator 550 receives the velocity vector and processes that information so that it can be utilized by the rake receiver 520. The velocity vector is derived from the GPS unit (not shown) at the mobile unit. In other words, if receiver 500 is part of the mobile handset then receiver 500 will include a GPS unit. If, on the other hand, receiver 500 is part of a base station than receiver 500 will receive the velocity information from the mobile unit. Examples of the difference between the mobile and stationary units are shown in FIG. 6 and FIG. 7.

Figure 6:
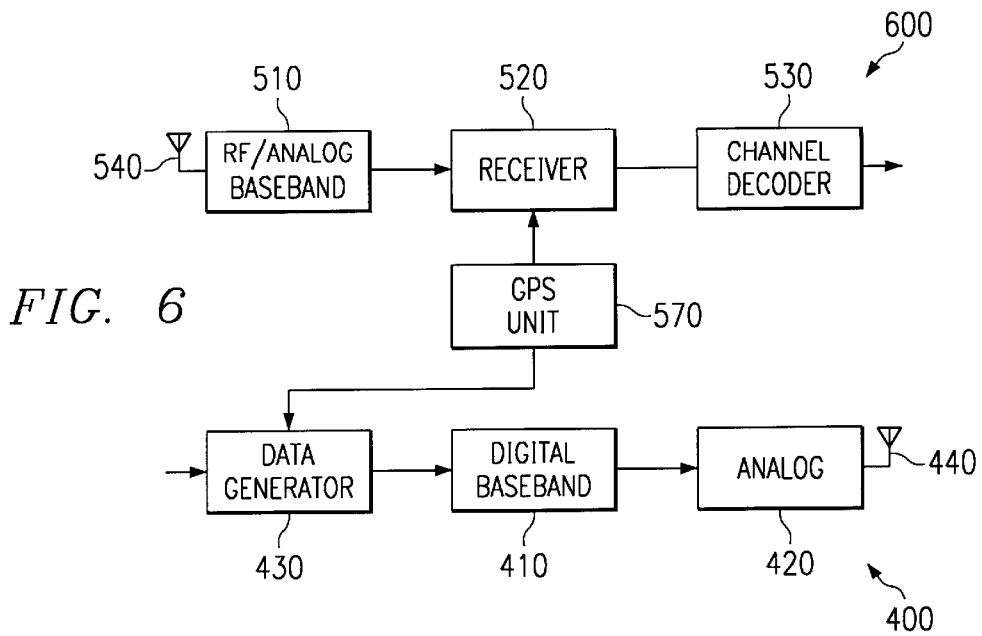
FIG. 6 comprises an exemplary embodiment mobile unit of the present invention.
Figure 7:
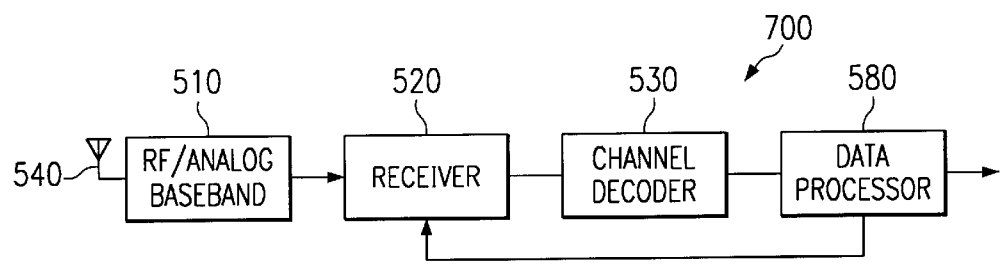
FIG. 7 comprises an exemplary embodiment stationary unit of the present invention.

FIG. 6 illustrates mobile unit 600. In this example, GPS unit 570 supplies GPS information to receiver 520, for example using the techniques shown in FIG. 5. The GPS unit 570 also supplies information to the transmitter portion 400 of mobile unit 600. This information will be properly formatted (e.g., in data generator 430) and then provided to digital baseband portion 410 for transmission. The velocity information can be calculated either within the GPS unit 570 or within the receiver 520.

It is noted that FIG. 6 provides a simplified view that is intended to schematically describe one embodiment of the present invention. It should be understood that many variations and additional details are possible.

A GPS receiver unit works as follows. The GPS satellites orbit the earth, transmitting their precise positions and elevations. The GPS receiver unit acquires the signal, then measures the interval between the transmission and receipt of the signal to determine the distance between the receiver and the satellite. Once the GPS receiver unit has calculated this data for at least 3 satellites, is location on the earth's surface can be determined.

FIG. 10 shows one particular GPS unit 570 along with a Doppler profile generator 540. The block diagram of the GPS unit 570 was taken from Peter H. Dana, Department of Geography, University of Texas at Austin (http://www.utexas.edu/depts/grg/gcraft/notes/gps/gps.html). The information downloaded from this website on Dec. 13, 1999 is hereby incorporated herein by reference.

Referring now to FIG. 7, stationary unit 700 receives the GPS information from a mobile unit. For example, data processor 580 can be designed to extract the GPS information from the data stream received by unit 700. The conversion from location/time to velocity can be performed by either the mobile or the stationary unit. The extracted information will then be fed back into receiver 520.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method of communicating between a mobile communication unit and a second communication unit, the method comprising:
   determining a location of the mobile communication unit at a first time, the location being determined using global positioning system (GPS) information;
   determining a velocity vector of the mobile communication at the first time;
   determining a radial velocity projected along a vector between the mobile communication unit and the second communication unit;
   calculating a Doppler profile using the radial velocity;
   determining a multipath profile of a wireless path between the mobile communication unit and the second communication unit; and
   using the Doppler and multipath profiles of the wireless path in order to apply diversity exploiting schemes to the communications between the mobile communication unit and the second communication unit.

2. The method of claim 1 wherein the mobile communication unit and the second communication unit communicate via code division multiple access (CDMA).

3. The method of claim 1 wherein using the Doppler profile in communicating comprises using the Doppler profile in receiving a communication from the mobile communication unit.

4. The method of claim 1 wherein the second communication unit is a stationary communication unit.

5. The method of claim 4 wherein using the Doppler profile in communicating comprises using the Doppler profile in receiving a communication from the stationary communication unit.

6. The method of claim 1 wherein the second communication unit is a mobile communication unit.

7. A method of communicating between a first mobile communication unit and a second mobile communication unit, the method comprising:
   determining a location of the first mobile communication unit at a first time, the location being determined using global positioning system (GPS) information;
   determining a velocity vector of the first mobile communication at the first time;
   determining a radial velocity projected along a vector between the first mobile communication unit and the second mobile communication unit;
   calculating a Doppler profile using the radial velocity; and
   using the Doppler profile in communicating between the first mobile communication unit and the second mobile communication unit;
   determining a location of the second mobile communication unit at the first time;
   determining a velocity vector of the second mobile communication at the first time; and
   wherein the radial velocity includes a contribution of the velocity vector of the first mobile communication unit and of the second mobile communication unit.

8. The method of claim 7 wherein calculating a Doppler profile comprises calculating a Doppler spread.

9. The method of claim 8 wherein calculating a Doppler profile further comprises calculating a number of Doppler components from the Doppler spread.

10. The method of claim 9 wherein the Doppler components are calculated using a sliding window correlation technique.

11. The method of claim 7 wherein the location of the second communication unit is determined using GPS information.

12. A wireless receiver comprising:
   an analog circuit coupled to receive an incoming signal from an antenna;
   a maximal ratio combining unit having an output;
   a receiver coupled to the analog circuit, the receiver manipulating the incoming signal;
   a Doppler profile generator coupled to the receiver, the Doppler profile generator providing Doppler diversity information to the receiver, the Doppler diversity information being derived at least in part from a velocity vector calculated from global positioning system (GPS) information; and
   a data generator coupled to the receiver, the data generator including a digital data output, a de-interleaver with an input coupled to the output of the maximal ratio combining unit; and a Viterbi decoder with an input coupled to an output of the de-interleaver, the digital data output carrying data based on the incoming signal.

13. The wireless receiver of claim 12 wherein the analog circuit includes an RF section and an analog baseband section.

14. The wireless receiver of claim 12 wherein receiver comprises a rake receiver.

15. The wireless receiver of claim 14 wherein receiver comprises a two dimensional rake receiver that exploits both multipath diversity and Doppler diversity.

16. The wireless receiver of claim 14 wherein the rake receiver includes a finger section that receives information from the Doppler profile generator.

17. The wireless receiver of claim 16 wherein the finger section further receives information from a delay profile generator.

18. The wireless receiver of claim 12 wherein the wireless receiver is part of a mobile unit, the wireless receiver further comprising a GPS unit, the GPS unit coupled to the Doppler profile generator.

19. The wireless receiver of claim 18 wherein the mobile unit further includes a transmitter, the transmitter providing the GPS information to a stationary unit.

20. The wireless receiver of claim 12 wherein the wireless receiver is part of a stationary unit and wherein the GPS information is transmitted to the stationary unit from a mobile unit.

21. The wireless receiver of claim 12 wherein the wireless receiver is part of a base station.

22. The wireless receiver of claim 12 wherein the receiver includes a rake receiver.

23. The wireless receiver of claim 13 wherein the wireless receiver further utilizes delay profile information in translating the received wireless signal into digital data.

24. The wireless receiver of claim 12 wherein the wireless receiver comprises a cellular telephone.

25. The wireless receiver of claim 24 wherein the wireless receiver is utilized in a code division multiple access (CDMA) system.

* * * * *